United States Patent [19]

Hunt

[11] Patent Number: 4,972,872

[45] Date of Patent: Nov. 27, 1990

[54] RELIEF VALVE

[76] Inventor: Kevin F. Hunt, 1700 Sea Spray, Apt. 2238, Houston, Tex. 77008

[21] Appl. No.: 429,358

[22] Filed: Oct. 31, 1989

[51] Int. Cl.[5] ............................................. G05D 16/20
[52] U.S. Cl. .................................................. 137/487.5
[58] Field of Search ........................ 137/487.5; 73/721

[56] References Cited

U.S. PATENT DOCUMENTS

| 3,308,846 | 3/1967 | Yuile | 137/487.5 |
| 3,548,866 | 12/1970 | Kaiser | 137/487.5 |
| 4,307,750 | 12/1981 | Ledeen | 137/487.5 |
| 4,610,256 | 9/1986 | Wallace | 73/721 X |

Primary Examiner—Alan Cohan
Attorney, Agent, or Firm—Vaden, Eickenroht, Thompson & Boulware

[57] ABSTRACT

A pressure relief valve is disclosed that includes a ball valve and an electrically powered valve operator for opening and closing the valve in response to electrical signals. A conduit connects a piezoelectric pressure gauge to upstream pressure. The gauge sends opening and closing electrical signals to the operator when the pressure in the conduit reaches preselected amounts.

2 Claims, 2 Drawing Sheets

RELIEF VALVE

This invention relates to pressure relief valves generally and, in particular, to relief valves for use with co-generation boilers and the large boilers that are found in electric power generation plants.

The relief valve of this invention is designed to replace the spring-loaded safety valves that are presently used on boilers and other pressure vessels. Spring-loaded safety valves are susceptible to leakage, breakdown, and other mechanical type problems.

Therefore, it is an object and feature of this invention to provide a pressure relief valve that does not employ a spring to open and close the valve.

It is a further object of this invention to provide a relief valve that includes a valve having a passageway through which fluid can flow to relieve a pressure build-up upstream of the valve; a valve seat and a valve element movable between a position closing the passageway and a position opening the passageway, an electrically powered valve operator for opening and closing the valve in response to electrical signals, a conduit connected to the passageway upstream of the valve element and a piezoelectric electric pressure gauge for sending opening and closing electrical signals to the operator when the pressure in the conduit reaches preselected amounts.

These and other objects, advantages, and features of this invention will be apparent to those skilled in the art from a consideration of this specification, including the attached drawings and appended claims.

In the Drawings

Figure 1:
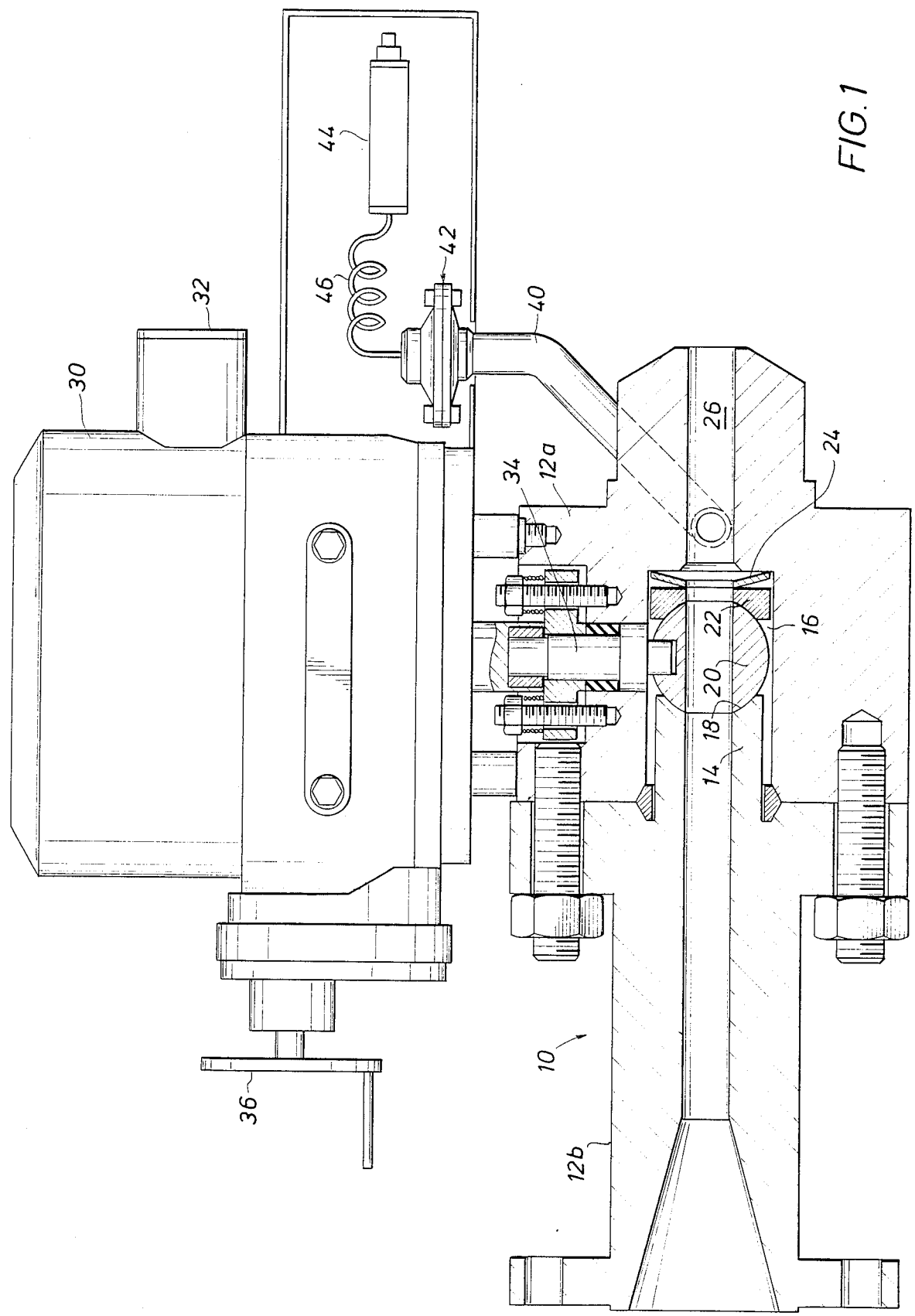
FIG. 1 is a view partly in section and partly in elevation of a ball valve, an operator for opening and closing the ball valve, and the pressure sensing apparatus of this invention.
Figure 2:
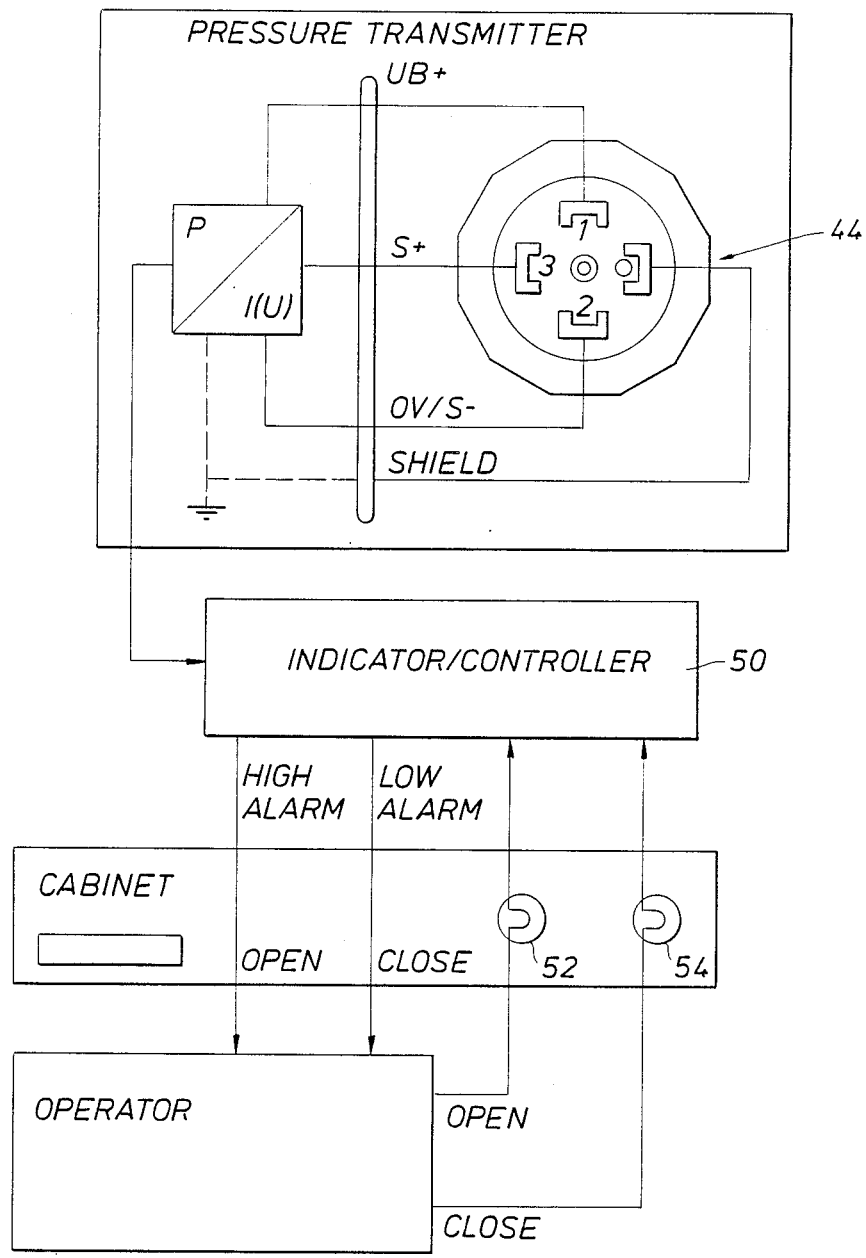
FIG. 2 is a schematic diagram of the piezoelectric pressure gauge, the indicator/controller, the cabinet, and the operator of the valve.

The preferred valve for use with this invention is a ball valve. Such a valve is shown in FIG. 1, where the valve is generally indicated by the number 10. The valve body is made up of two parts 12a and 12b. Section 12b has a cylindrical portion 14 that extends into opening 16 of section 12a of the body and provides seating surface 18 to engage ball 20. Upstream seat 22 is held in engagement with ball 20 by Belleville spring 24. Passageway 26 extends through section 12a of the body, through the Belleville spring, the upstream seat, ball 20, and section 12b of the body. When ball 20 is in the position shown, fluid can flow through passageway 26 and relieve pressure upstream of the valve.

The upstream end of section 12a of the body is connected in any convenient manner to the boiler or pressure vessel with which the valve is being used so that pressure in the pressure vessel or the boiler will be the pressure in passageway 26 upstream of ball 20 when the ball is closed.

Operator 30 is powered by electric motor 32, a portion of which is shown in FIG. 1. The electric motor rotates stem 34 in one direction to close the ball and in another direction to move the ball to the open position shown in FIG. 1. Normally the ball will be closed. A manual override of operator 30 is provided to allow the valve to be operated manually by rotating wheel 36.

Connected into passageway 26 upstream of ball 20 is conduit or pressure tap 40. Through this conduit, the pressure in passageway 26 is transmitted to diaphragm 42. The other side of the diaphragm is connected to piezoelectric pressure gauge 44 through tube 46. Tube 46 is filled with liquid so that the pressure of the fluid on the other side of diaphragm 42 will be transmitted directly to piezoelectric pressure gauge 44. If the relief valve is being used on a steam boiler, tube 46 should be long enough for any heat transmitted to the liquid in the tube to be lost to the ambient atmosphere before it can reach the piezoelectric pressure gauge. In the embodiment shown, the tube is coiled to provide more length. Also, preferably, the diameter of the opening in the tube is small, like a capillary tube.

The liquid in tube 46 should have a high boiling point so that it will not boil and create a false pressure reading. Two elements that are ideal for this service are sodium and potassium. Both have a relatively low melting point, 208° F. (97.6° C.) for sodium and 140° F. (63° C.) for potassium. Both also have a high boiling point, 1,650° F. (892° C.) for sodium and 1,400° F. (770° C.) for potassium. Thus, steam at 1,000° is well below the boiling point of either element.

Piezoelectric pressure gauges are very accurate and can be accurate to within 0.25 psi. The electrical output of the piezoelectric crystals in the gauge is transmitted to indicator controller 50. At a preselected high pressure, the indicator controller will send an electrical signal to operator 30 and open the valve. The indicator controller is also provided with a low alarm sensor that will close the valve when the pressure drops to some preselected amount. Lamps 52 and 54 indicate whether the valve is open or closed.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A pressure relief valve comprising a valve body having a passageway through which fluids can flow, a valve seat, and a ball mounted for rotation between a position closing the passageway and a position opening the passageway, an electrically powered valve operator for opening and closing the valve in response to electronic signals, a conduit connected to the passageway upstream of the valve element, a piezoelectric pressure gauge for sending opening and closing electronic signals to the operator when the pressure in the conduit reaches preselected values, and a pressure transmitter located in the conduit between the passageway and the piezoelectric pressure gauge, the part of the conduit between the pressure transmitter and the piezoelectric pressure gauge is long enough to protect the pressure gauge from the heat of the fluid in the passageway.

2. The pressure relief valve of claim 1 in which the part of the conduit between the pressure transmitter and the piezoelectric pressure gauge is filled with one of the group consisting of sodium and potassium.

* * * * *